United States Patent [19]

Hurst

[11] 4,290,763

[45] Sep. 22, 1981

[54] METHOD FOR PRODUCING ENCLOSED MULTIPANELED ENVELOPES

[76] Inventor: Gerald L. Hurst, 1401 Spring Garden, Austin, Tex. 78746

[21] Appl. No.: 48,787

[22] Filed: Jun. 15, 1979

[51] Int. Cl.³ .............................................. B31D 5/00
[52] U.S. Cl. .................................... 493/341; 493/342; 493/346; 493/959
[58] Field of Search .................. 93/61 R, 63 M, 63 R, 93/35 R, 33 H, 8 R, 35 PT, 35 SB; 46/87; 244/31; 156/510, 515; 493/341–346, 379–381, 373, 959

[56] References Cited

U.S. PATENT DOCUMENTS

| | | | |
|---|---|---|---|
| 1,625,394 | 4/1927 | Roberts | 46/87 X |
| 1,885,917 | 11/1932 | Kelemen et al. | 46/87 |
| 3,006,257 | 10/1961 | Orsini | 93/35 R |
| 3,380,646 | 4/1968 | Doyen et al. | 93/35 R X |
| 4,038,777 | 8/1977 | Schwartz | 46/87 |
| 4,077,588 | 3/1978 | Hurst | 46/87 X |

Primary Examiner—James F. Coan
Attorney, Agent, or Firm—Richards, Harris & Medlock

[57] ABSTRACT

A method for producing an enclosed, multipaneled envelope from webs of material in a manner such that the desired multipaneled shape of the envelope can be formed by a single peripheral application of a platen sealing device to positioned webs comprising a first web, and second web with at least one folded web interposed therebetween. Both geometric and nongeometric multipaneled envelopes can be produced in this manner from materials suitable for filling with a lighter-than-air gas to form toy balloons and the like.

11 Claims, 16 Drawing Figures

METHOD FOR PRODUCING ENCLOSED MULTIPANELED ENVELOPES

BACKGROUND OF THE INVENTION

In one aspect, the present invention relates to a method for producing multipaneled envelopes which are completely enclosed so as to be suitable for use as balloons. In another aspect, the present invention relates to multipaneled, completely enclosed, envelopes suitable for use as lighter-than-air balloons which can be fabricated by a single stroke from a platen sealer and may have geometric as well as nongeometric shapes.

The fabrication of gusseted containers and packages from webs of material employing platen type sealers, most commonly heat-type platen sealers, has been known in the art of packaging for some time. However, such packaging techniques commonly are limited to the production of bags, pouches and the like which are useful for most conventional packaging operations. In the past, paneled envelopes, suitable for inflating with gases to form inflated toys or balloons, were fabricated by separately sealing each of the panels together. For example, conventional beach ball shapes are made by separately sealing six elliptical panels together and then sealing two circular end pieces at the top and bottom of the spheres so formed.

Thus, while platen type sealing methods have been employed in the past to form packaging articles of fairly simple geometric configuration, the advantages of such a sealing method have not been applied to produce enclosed, multipaneled envelopes for use as balloons, blimps, and irregularly shaped inflatable toy articles. Therefore, a method whereby these kinds of articles could be fabricated from a single stroke of a platen type sealing device would be advantageous. Further, a method for fabricating enclosed, multipaneled envelopes from a material suitable for forming air buoyant balloons for use as toys, advertising materials, and similar uses would be desirable. Such methods would be especially useful in combination with the permanently buoyant balloons disclosed in U.S. Pat. No. 4,077,588 issued Mar. 7, 1978 and in U.S. patent application Ser. No. 864,769, filed Dec. 27, 1977, which are hereby incorporated by reference.

SUMMARY OF THE INVENTION

The method of the present invention provides for the production of enclosed multipaneled envelopes fabricated from materials which are sealable on one side only and which are suitable for filling with a ligher-than-air gas to form a buoyant balloon. Basically the method comprises (1) positioning a first web of material, of sufficient surface area to form the desired panel shape, adjacent a platen seal forming means, (2) positioning at least one folded web member over the first web such that the edges of the panel shape to be formed therefrom will be coextensive with at least one edge of the panel shape to be formed from the first web, (3) positioning a second web of material over the first web and folded web such that the edges of the panel shape formed from the second web will be coextensive with the edges of the panel shape to be formed from the first web and (4) platen sealing the first web, folded web, and second web with a single stroke of the platen sealer in a peripheral manner in a desired panel shape. In addition, a multiple number of folded webs may be positioned between the first and second webs to achieve the desired geometric or irregular shape upon inflation of the envelope with a lighter-than-air gas.

BRIEF DESCRIPTION OF THE DRAWINGS

The method of producing the enclosed, multipaneled envelopes of the subject invention can be better understood from a study of the drawings in which.

DETAILED DESCRIPTION OF THE INVENTION

Figure 1:
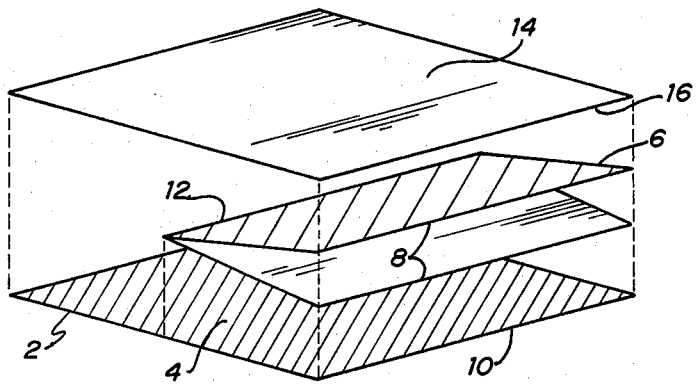
FIG. 1 is an exploded perspective view showing the aligned relationship of a first web, second web and folded web.

I have discovered an improved and efficient method for producing multipaneled, enclosed envelopes suitable for filling with lighter-than-air gas to form toy balloons and the like. Basically, the method comprises employing a material (as further described below) which is suitable for the manufacture of lighter-than-air balloons and which is available in sheets, or rolls (hereinafter referred to as webs) and which is sealable with webs of like material only on one side thereof. Thus, when the sealable sides of two webs of such material are facing one another, they can be sealed, however, when the same sealing operation is performed on two pieces of such material having nonsealable sides adjacent, no such sealing will be effected. Thus, by positioning a first web of material on a work surface and positioning thereover a folded web of material, comprising at least one fold line along a line of symmetry of the panel to be shaped from said folded web, and positioning a second web of material over said folded web in a manner such that the sealable sides of the first and second webs face inward while the sealable sides of the folded web member face outward, the first and second web members can be sealed to the folded web member while the folded web member will not seal to itself.

In order to make a buoyant toy balloon which can be filled with a lighter-than-air gas and remain substantially permanently buoyant, I have found that the envelope material should comprise either a substrate of metal foil having laminated on at least one side thereof a nonelastomeric polymer sheet, or a substrate of regenerated cellulose having laminated on at least one side thereof a polyvinylidene chloride sheet, or, most preferably, a nonelastomeric polymer sheet having a continuous thin metal coating deposited thereon. The envelopes of the subject invention also have a ratio of the initial internal volume ($V_0$) taken to the two-thirds power divided by the surface area (S) of the envelope in the range of from about 0.21 to about 0.01, i.e., the ratio of:

$$V_0^{\frac{2}{3}} = \sim 0.21 \text{ to } \sim 0.01$$

The unit weight of the envelope (depending upon the size) can range from a low of about $5.3 \times 10^{-4}$ lbs/ft.$^2$ ($2.6 \times 10^{-4}$ gm/cm$^2$) to a high of about $3.5 \times 10^{-2}$ lbs./ft.$^2$ ($1.7 \times 10^{-2}$ gm/cm$^2$). Thus, the composite materials most useful in the method of producing an improved envelope suitable for filling with lighter-than-air gases are substantially impermeable to lighter-than-air gases such as helium. Additional sheets of nonelastomeric polymer provide increased strength and resistance to tearing as well as filling in pinholes or imperfections that may exist in the substrate layers. While the most preferred films are those briefly described above, and further described in detail below, a variety of films not having a metal coating can also be employed to manufacture the enclosed multipaneled envelopes of the present invention. The requirements for such other films is that they be heat sealable on one side only and that they be of a density and strength suitable for the intended use. Of course, nonmetalized films which are currently available will not provide the substantial impermeability of the preferred films described herein.

The most preferred film for use in fabricating the multipaneled, envelopes of the present invention comprises a substrate of a continuous nonelastomeric polymer film such as, for example, polyolefins such as polyethylene or polypropylene, polyvinylidene chloride, polyester, polyvinyl chloride, cellophane, polyvinyl alcohol, regenerated cellulose, polyurethane, ethylene vinyl acetate copolymers, polyamides and nitryl polymers, and the like. Deposited on such nonelastomeric polymeric materials is a continuous layer of a vapor deposited metal. Any conventional technique can be utilized for the vapor deposition of the metal layer upon the nonelastomeric polymer layer. Generally, a metal layer having a thickness in the range of from about $3 \times 10^{-7}$ inches to about $2 \times 10^{-3}$ inches and preferably from $1 \times 10^{-6}$ inches to about $5 \times 10^{-5}$ inches is sufficient. It has been found that the continuous nonelastomeric polymer film can receive a coating of metal by vapor deposition sufficient to render the film essentially opaque and result in a substantially gas impermeable composite.

When polyvinylidene chloride sheet laminated to a regenerated cellulose substrate is utilized, the polyvinylidene chloride sheet is preferably laminated to the outside surface of said substrate to serve as a moisture barrier. Additional nonelastomeric polymer sheets can also be laminated to the inside surface of the substrates to facilitate sealing together the individual panels from which the subject envelopes are made. Preferred nonelastomeric polymer sheets for this purpose are low density polyethylene, polyvinylidene chloride, and the like. Multipaneled, enclosed envelopes fabricated from all these materials can have printed indicia or designs appearing thereon. The indicia or design can be printed on the webs of material prior to fabrication of the envelope or after the envelope has been made according to the process set forth below.

The above-described types of materials used to produce lay-flat envelopes which are multipaneled and which are suitable for filling with lighter-than-air gas to form balloon toys and the like, can be used in the process of this invention in the form of individual sheets or continuous rolls. In either case, an expanse of such film material is referred to as a "web" from which the panels, which make up the envelopes of the present invention, are formed. The word "panel" as employed herein refers to that portion of a web of material which has the desired two-dimensional configuration and which is joined to other panels of material via either a "seal line" or a "weld line." A "seal line" as used herein is defined to mean a line of adhesion, normally about the periphery of the panel shape, used to attach one web of material to a second web. The term "weld line" as used herein is defined to mean a line of adhesion used to affix portions of the same web of material to itself. Thus, a weld line can be used to define the shape of two panels formed from the same web of material or can comprise an intrapanel line of adhesion between portions of the same web as will be further described hereinbelow.

It is important to note that when employing the above-described types of materials to produce enclosed, multipaneled envelopes capable of air buoyancy, several critical requirements arise which are not present if the same or similar types of materials were to be employed to fabricate bags, packages, or other multipaneled envelopes not intended to be used as air buoyant balloons. Thus, for example, in the manufacture of bag type articles, the material used in fabrication may be folded over itself in order to obtain the desired bag construction. An example of this type of technique is the common shopping bag. However, such folding over of excess materials in order to obtain the desired shape of the final article cannot be employed in the fabrication of multipaneled, enclosed envelopes of the present invention since the extra weight factor added by such folds is detrimental to the final air buoyancy of the balloons.

A second limitation in the fabrication of multipaneled, enclosed envelopes manufactured from the materials disclosed above is that the panels must be of such a shape and must be sealed together in such a manner so as to avoid any wrinkles in the multipaneled, enclosed envelope upon inflation. Thus, for example, where an elastomeric material is employed, the presence of wrinkles in the material emanating from seal lines and weld lines would not be of great disadvantage since upon inflation the elastomeric material would tend to expand and stretch out the wrinkles. However, when employing the nonelastomeric types of substantially gas impermeable materials described above, no such stretching would occur and wrinkles present in the multipaneled, enclosed envelope in a collapsed state will also be present in an inflated state and would thus present problems both aesthetically and from a weight/volume ratio standpoint, with respect to buoyancy.

The lay-flat envelopes can be either of geometric design such as hexahedrons, octahedrons and the like, or can be of irregular shape, for example, the shape of animals. In order to more clearly demonstrate the process of the subject invention, a method for producing a hexahedron will now be described with relation to FIG. 1. Thus, the process of the present invention comprises positioning a first web 2, which can be a sheet or a portion of a roll of the material described above, on a work surface. The material which is sealable on one side only is shown with the sealable side 4 thereof facing upward. The first web 2 of material should be of sufficient area to insure that the desired panel shape can be formed therefrom. Next, a folded web member 6 is positioned over first web 2 in a manner such that the edges 8 thereof will be coextensive with the edge 10 of the first web 2. Further, fold line 12 of folded web member 6 is folded along a line of symmetry of the panel which will be formed therefrom. Next, a second web 14 is positioned over folded web 6 and first web 2 in a manner such that its edges 16 are coextensive with the edges 10 of the first web 2. It should be noted that FIG. 1 shows the first web 2, folded web 6, and second web 14 in an exploded relationship whereas in actual practice (using one of the methods described hereinbelow) the lay-over relationship of these three webs of material can be accomplished quickly and easily.

Figure 2:
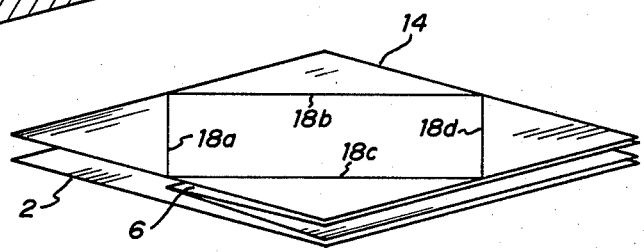
FIG. 2 is a perspective view showing the first, second, and folded webs of FIG. 1 in position for fabrication with panel defining sealing lines designated thereon.

Referring to FIG. 2 which shows the first web 2, folded web 6 and second web 14 in a normal lay-flat processing position, a platen sealer can be used to form platen sealing lines 18 which, in the case of FIG. 2, form the shape of a square. Thus, sealing lines 18 cause the sealable side of second web 14 to attach to the sealable side 4 of first web 2 along sealing lines 18a and 18b and cause second web 14 to become attached to folded web 6 along sealing lines 18c and 18d. Further, sufficient force is used with the platen sealing device so as to cause the sealable side of folded web 6 to seal to first web 2 along sealing lines 18c and 18d. However, because the interior surfaces of folded web 6 are not sealable, no weld line, joining the surface of folded web 6 to itself, occurs. Concurrently, with the formation of sealing lines 18 with the platen sealing device, excess portions of first web 2, folded web 6 and second web 14 may be trimmed away to form an enclosed, multipaneled envelope through the use of conventional film cutting apparatus and techniques.

Figure 3:
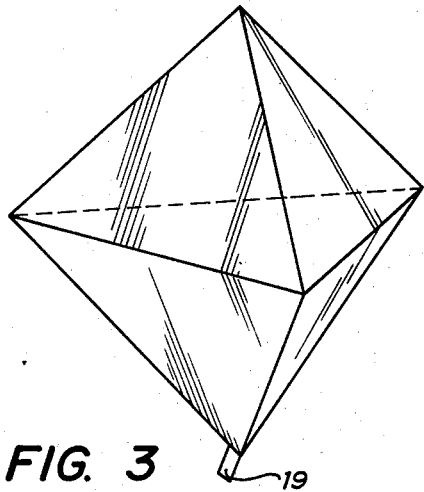
FIG. 3 is a perspective view of the hexahedral shape of the multipaneled, enclosed envelope of FIGS. 1 and 2 when inflated.

Referring to FIG. 3, it can be seen that the envelope produced by the process depicted in FIGS. 1 and 2, when inflated with a ligher-than-air gas, forms the shape of a hexahedron. Thus, the process described above, with relation to FIGS. 1 and 2, can be used to fabricate lighter-than-air balloons, the only additional step necessary being the provision of a suitable filling nipple 19 for inflating the envelope with a lighter-than-air gas. Such a filling nipple 19 may be provided in any of the enclosed, multipaneled envelopes of the present invention by including tab portions on two or more of the panels and sealing the tab on two sides thereby forming a conduit to the interior of the envelope. The filling nipple 19 can be sealed, after inflation of the envelope, by heat sealing, spring clamping or similar means. In addition, virtually any type of common valve seal used for inflating conventional plastic toys and the like can be used in place of the filling nipple described above, or such seals as adhesive patches and hypodermic type septums can likewise be used.

Figure 4:
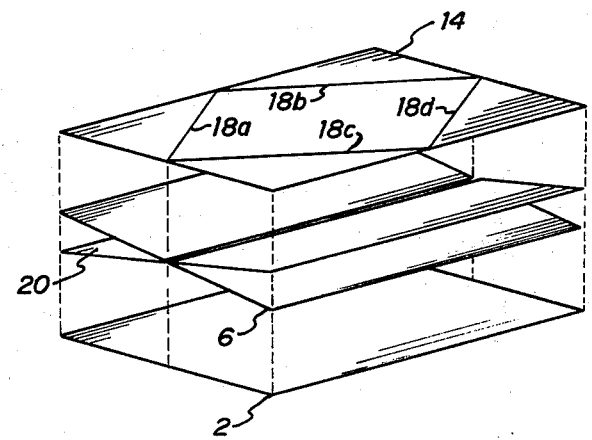
FIG. 4 is an exploded perspective view showing the aligned relationship of a first web, two folded webs, and a second web.
Figure 5:
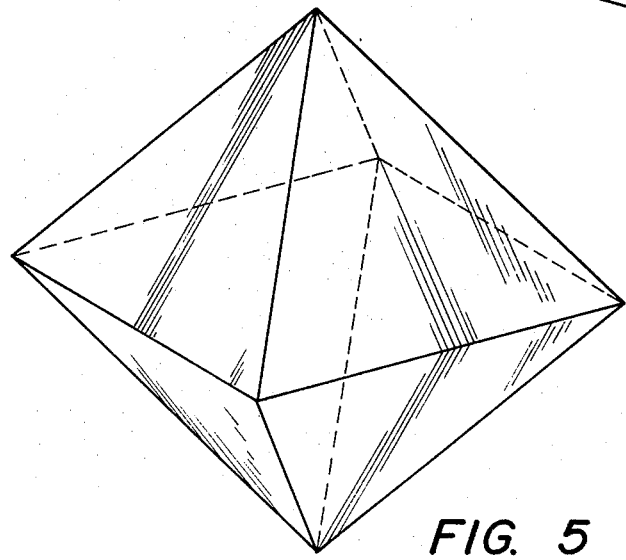
FIG. 5 is a perspective view of the octahedral shape of the multipaneled, enclosed envelope, produced from webs positioned as shown in FIG. 4, when inflated.

Referring to FIG. 4, the first web 2, and second web 14 are depicted as in FIG. 1 above, except this time with a second folded web 20 in addition to folded web 6. Folded webs 6 and 20 are positioned with the fold lines thereof parallel and either closely adjacent, as depicted in FIG. 4, or spaced apart. By following the procedures set forth above with respect to FIGS. 1 and 2, that is, platen sealing first web 2, folded webs 20 and 6 and second web 14 along sealing lines 18, shown in FIG. 4 in the shape of a parallelogram, a lay-flat envelope can be manufactured which upon inflation will generally have the shape of an octahedron as depicted in FIG. 5.

It should be noted with respect to the symmetrical fold line 12 of folded web 6 described above, that other fold lines parallel to fold line 12, which is along a line of symmetry of the panel shaped from folded web 6, can be employed in some cases. However, when more than one fold is made on the folded web member the line along which the platen sealing device will be used to create sealing lines 18 must be kept in mind, since a double fold will bring the sealable sides of the folded web member into contact with one another which can cause an undesired weld line along said folded web member. In other cases, such a weld line along the folded web member may be desirable to produce a desired effect (as further disclosed hereinbelow).

Figure 6:
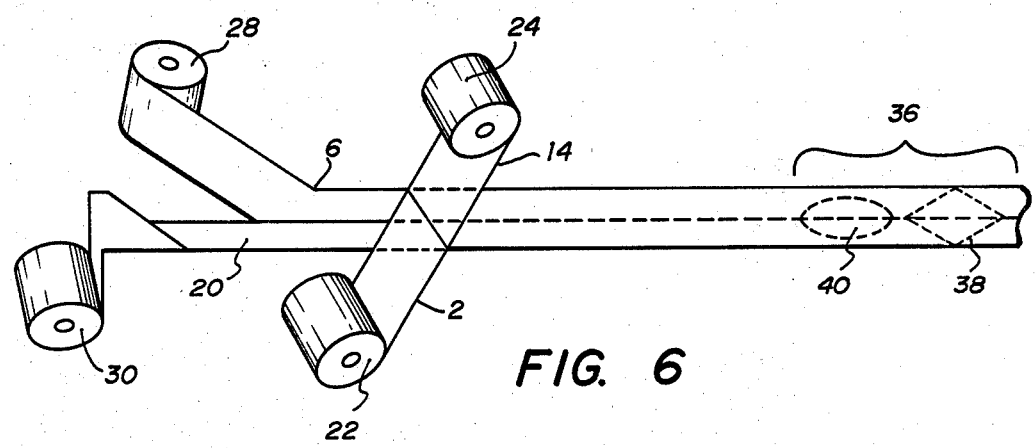
FIG. 6 is a schematic representation of a first production line method for producing the enclosed, multipaneled envelopes of the subject invention.
Figure 7:
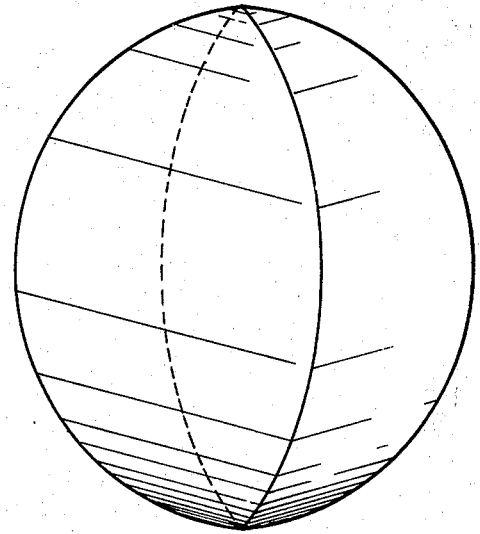
FIG. 7 is a perspective view of a hot air balloon shaped inflated envelope produced by the process shown in FIG. 6.

Now referring to FIG. 6, a schematic representation of a production line set up which can be used to practice the process of the subject invention is shown. Thus, roll 22 which supplies first web 2 and roll 24 which supplies second web 14 can be positioned above and below a work surface upon which the envelope of the present invention will be formed. Intermediate of rolls 22 and 24 folded web rolls 28 and 30 can be used to supply folded webs 6 and 20 respectively. A center folding means (not shown) which can comprise a mandrel over which the film is drawn and folded in half from the center is used to insure that both folded web members 6 and 20 are folded along a fold line which is substantially symmetrical with respect to the panel shapes to be formed therefrom. Thus, by the time the webs of material reach the platen sealing and die cutting section 36 of the operation, the first web 2, folded webs 6 and 20 and second web 14 are positioned in the manner set forth above with reference to FIG. 4. Panel shapes can then be platen sealed and cut at the platen sealing and die cutting section 36. For example, dotted lines 38 depict a method for sealing and cutting which would result in the octahedron, as shown in FIG. 5. Alternatively, an elliptical shape can be stamped as shown by dotted lines 40 and the resulting envelope, upon inflation, will have the shape of a hot air balloon. The shape of the inflated balloon manufactured upon platen sealing first, second and two folded webs together in the shape shown by dotted lines 40 is set forth in FIG. 7.

Figure 8:
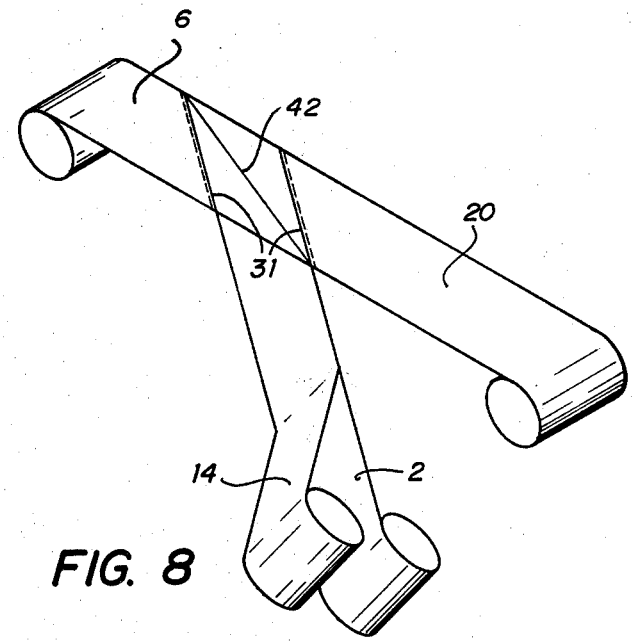
FIG. 8 is a schematic representation of a second production line method for producing geometric shaped enclosed, multipaneled envelopes.

It is also within the scope of this invention to employ production lines arrangements which provide for a minimum amount of wasted film material. Thus, for example, when a geometric shape is desired, more efficient use of the webs of material may be accomplished by rearranging the manner in which the first web, folded webs, and second web are aligned for sealing and cutting. Thus, referring to FIG. 8, a method for producing an envelope which will inflate to the shape of an octahedron is depicted which makes use of 100% of the from material employed. In this embodiment of the invention, the first web 2 and second web 14 are aligned substantially in the same manner as is set forth with reference to FIG. 6. However, the two folded web members 6 and 20 are formed by running the length of the roll of material between second web 14 and first web 2 at a processing angle φ which is less than 90° with respect to the longitudinal centerline of first web 2 and second web 14. The fold 42 of folded web 6 is folded at an angle equal to ½ of φ with respect to the edges of folded web 6 and is folded back in a triangular fashion upon itself. It is noted that fold line 42 is still along a line of symmetry with respect to the panel shape which is to be formed from first web 2 and second web 14 as will be further described below. Folded web 20 is folded back over itself in a triangular fashion in a similar manner. Once first web 2, folded webs 6 and 20 and second web 14 are in place, a platen sealing and cutting unit can be used to cut the panel shape of said first web 2 and second web 14 along the dotted lines 31, as shown in FIG. 8. The resulting enclosed, multipaneled envelope will have the shape of an octahedron (see FIG. 5) upon inflation.

Figure 15:
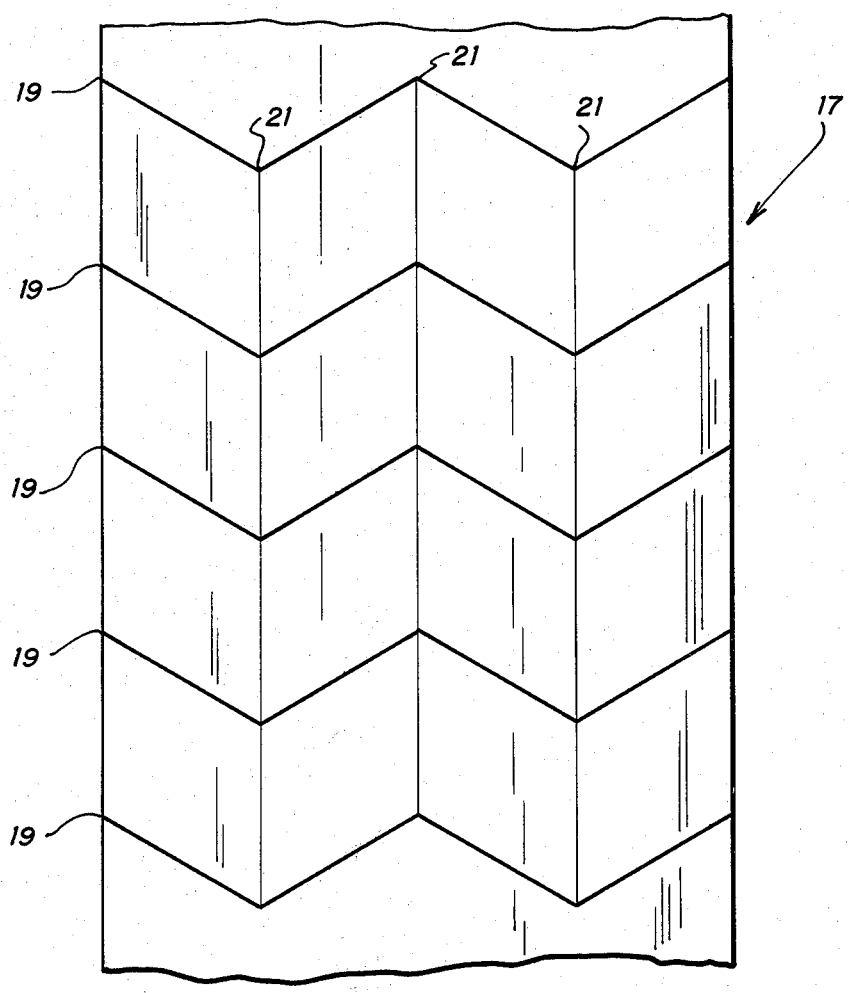
FIG. 15 is a top view of a length of heat sealable material with cut and score lines for fabricating a plurality of enclosed, multipaneled envelopes of octahedral shape.
Figure 16:
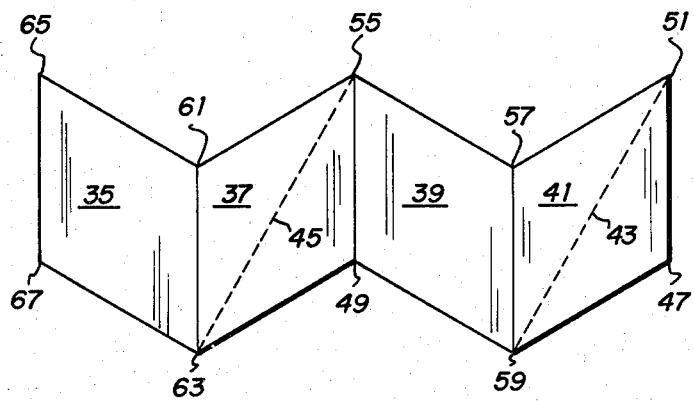
FIG. 16 depicts a single cut portion of material obtained from the length of material shown in FIG. 15.

A further method for maximum film utilization when producing geometrically shaped enclosed, multipaneled envelopes is depicted in FIGS. 15 and 16. Exemplary of this method is the production of an eight-paneled octahedron (such as that depicted in FIG. 5) which can be fabricated in the following manner. First, a length of film material 17, heat sealable on one side only as described above, is cut along cut lines 19 and scored along score lines 21 (as shown in FIG. 15) to form a W-shaped piece of material as shown in FIG. 16. Panels 35, 37, 39 and 41 can then be folded in the following manner and heat sealed with one stroke to form an enclosed, multipaneled, octaheral envelope. First, panel 41 is folded along line of symmetry 43 thereof and also along score line 21 between points 57 and 59 such that point 51 lies on top of point 55 and point 47 lies on top of point 57. Next, panel 37 is folded along fold line 45 and along score line 21 (between points 55 and 49) such that point 63 lies on top of point 59 and point 61 lies on top of point 49. Finally, panel 35 is folded along score line 21 (between points 61 and 63) such that point 65 lies on top of point 55 and point 67 lies on top of point 57. In this manner, a first web of material 39 has two folded webs 37 and 41 positioned thereon, the folded webs comprising a fold along the line of symmetry thereof with a fourth panel 35 positioned thereover. A single heat seal around the edges of the resulting parallelogram will form an enclosed envelope of octahedral shape upon inflation.

While the above example used parallelograms having 60 degree to and bottom apices to form an octahedron from four panels, this method can also be employed using three, five or six panels, for example, as well as other angles at the apices. Further, it should be noted that once folded and heat sealed, hot air balloon shaped multipaneled, enclosed envelopes can be formed by die cutting the apical portions of the panels.

In another embodiment of the present invention, nongeometric shapes, such as, for example, shapes of animals which make popular balloon toys for children, can be formed efficiently using the method set forth herein. For purposes of illustration only, the fabrication of an enclosed, multipaneled envelope suitable for inflation with a lighter-than-air gas which, when inflated, will approximate the shape of a pig will be described hereinafter, two alternate embodiments being set forth depending upon the desired shape of the animal.

Figure 9:
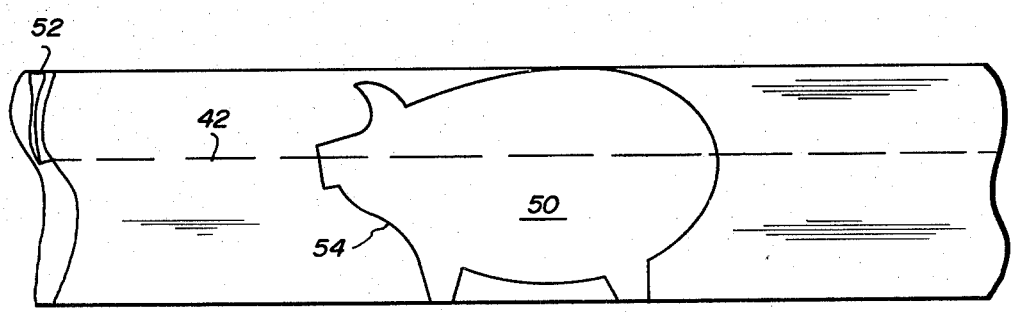
FIG. 9 is a top view of a second web, showing the position of the folded web in dotted lines, and further showing the side panel shape of the animal shaped multipaneled, enclosed envelope to be produced.
Figure 10:
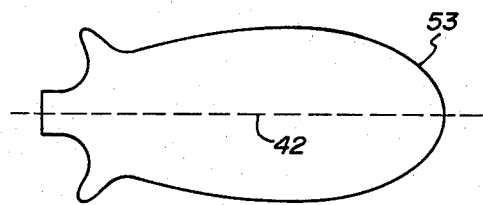
FIG. 10 is a top view of the top panel shape of the animal shaped envelope, fabricated from the folded web shown in dotted lines in FIG. 9.
Figure 11:
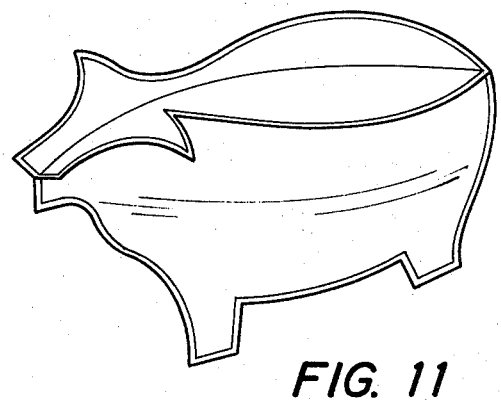
FIG. 11 is a perspective view of the three paneled animal shaped envelope.

Thus, referring to FIGS. 9 and 10, a process for fabricating an enclosed, multipaneled envelope in a lay-flat position which when inflated will resemble a pig is shown. Such an envelope can be manufactured using a first web and a second web with a folded web sandwiched therebetween substantially as described above. Thus, referring to FIG. 9, a top view of a length of web material shows the side panel 50 of a pig which can be struck with a platen type sealing device and trimmed accordingly. The folded web member 52 sandwiched between the first and second webs will have a fold line 42 along the dotted line depicted in FIG. 9. When the platen sealing device forms the peripheral seal line 54 in the shape of a pig, the resulting panel shape 53 which is formed from the folded web member 52 will be substantially as shown in FIG. 10. It is noted that fold line 42 lies along a line of symmetry of the panel shape 53 formed from the folded web member 52. Of course, a second folded web member could be positioned so as to form a four paneled envelope resembling the shape of a pig when inflated. FIG. 11 depicts a perspective view of a three paneled pig shaped inflated envelope produced in the manner described above.

Figure 12:
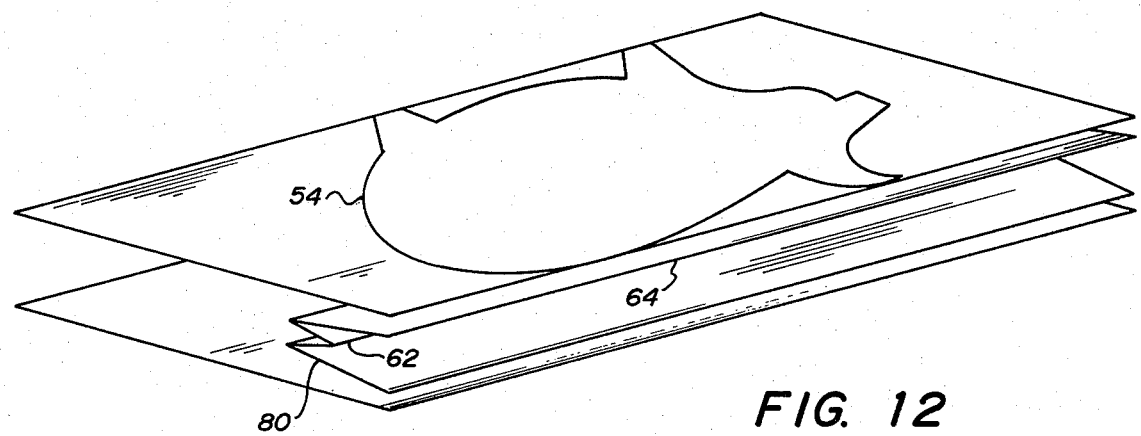
FIG. 12 is an exploded perspective view showing the aligned relationship of a first web, double folded web, and second web of an animal shaped envelope.
Figure 13:
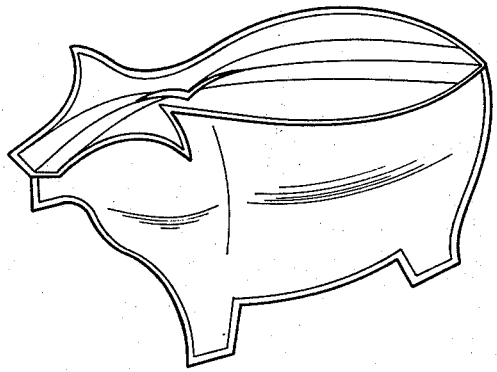
FIG. 13 is a perspective view of the inflated animal shaped envelope of FIG. 12.
Figure 14:
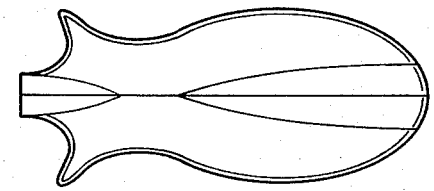
FIG. 14 is a top view of the inflated animal shaped envelope of FIG. 13.

Finally, an especially useful technique when it is desired to form nongeometric shapes, such as animals having head and tail sections, is made possible by double folding the folded web member (or members). Basically, by double folding a folded web member 80, as shown in FIG. 12, and insuring that a desired portion of the double fold line 62 will intersect the sealing lines 54 along which the platen sealing device is run, an intrapanel weld line 64 will be formed along that portion of the double fold line 62 which intersects the path of the platen sealing device and will thereby from a pinched section in the folded web member. FIG. 13 depicts a perspective view of a three paneled pig shaped inflated envelope produced in the manner described above. This pinched section can be employed to designate a head area of an animal from a body area, as shown, for example, by the top view of a pig shaped envelope depicted in FIG. 14.

The techniques described above, and others, can be conveniently performed employing as few as a single web of material. In the case of a single web, folds will have to be fabricated such that a first portion of the web provides the the underlying "first web" surface, a second portion of the web, comprising at least one fold, provides the "folded web" member and a third portion of the web comprises the overlying "second web." In this case, the "seal lines" described above, which are formed by a platen type sealing device, for example, would actually be weld lines joining portions of the single folded web to itself to define panels.

It should be noted that various sealing techniques can be used to seal the composite sheet material to form the enclosed, multipaneled envelopes in accordance with the subject invention. If the composite panels are heat sealable, then the panels can be heat sealed together in any conventional manner. For example, a jaw type sealer using a hot bar or rollers can be used to fabricate the heat seals or impulse sealers can be used which deliver a controlled impulse of electrical current through a ribbon and the resistance of this ribbon converts this current to heat, thus forming a seal. Alternatively, a hot wire sealer can be used which basically comprises a heating element comprising hot wires which are heated by means of electrical current. Other types of thermal energy generating means can be used such as ultrasonic sealing, or sealing by light or other forms of radiant energy such as laser energy, dielectric sealing (electronic) induction bonding, or infrared bonding. Furthermore, other means of sealing the envelope panels can be utilized in the scope of the subject invention other than heat sealing, such as for example, adhesive bonding, solvent sealing, extruded bead sealing and hot melt sealing. When sealing peripheral portions of the composite envelope panels together with adhesive bonding, an adhesive such as ethylene vinylacetate can be applied to the peripheral portions of the envelope material such as through zone coding of these materials (i.e., the printing press method). Examples of other methods of applying such added sealant are by adding strips of sealing material between the two films to be sealed at the sealing edges; extruding a flat strip of sealing material on the sealing edge; extruding a string of sealing material on the sealing edge; and adding a string of sealing material between the two films to be sealed at the sealing edges.

While the subject invention has been described with relation to the preferred embodiments thereof, various modifications and adaptations thereof will now be apparent to those skilled in the art. All such modifications and adaptations as fall within the scope of the appended claims are intended to be covered thereby.

I claim:

1. A method for producing an enclosed, multipaneled envelope suitable for inflation with a lighter than air gas to form a buoyant balloon from webs of nonelastomeric material which are sealable on one side only comprising the steps of:
   (a) positioning a first web of said material of sufficient surface area to form a desired panel shape;
   (b) positioning at least one folded web member of said material over said first web such that the edges of the panel shape to be formed therefrom will be coextensive with an edge of the panel shape to be formed from said first web, said folded web comprising at least one fold line along the line of symmetry of the panel shape to be formed therefrom;
   (c) positioning a second web of said material over said first web and folded web such that the edges of the panel shape to be formed therefrom will be coextensive with the panel shape to be formed from said first web; and
   (d) platen sealing said first web, folded web, and second web peripherally in the desired panel shape of said first and second webs;
   the panels of the resulting envelope having substantially the same circumferential measurement after inflation as before.

2. The method of claim 1 and further comprising the step of trimming any excess material from the enclosed, multipaneled envelope defined by the seal lines formed by said platen seal forming means.

3. The method of claim 1 comprising, in step (b) thereof, positioning two or more adjacent folded webs of material, fold line parallel to fold line, to form a multipaneled, enclosed envelope.

4. The method of claim 1 or 3 wherein the panel shape formed from said first web is a parallelogram.

5. The method of claim 1 or 3 wherein the panel shape formed from said first web is eilliptical.

6. The method of claim 1 wherein said webs of material are selected from the group consisting of composite materials comprising a substrate of metal foil having a nonelastomeric polymer sheet on at least one side thereof, composite materials comprising a substrate of nonelastomeric polymeric sheet having a vapor deposited metal coating on at least one side thereof, and composite materials comprising a substrate of regenerated celluslose having laminated on at least one side thereof a polyvinylidiene chloride sheet.

7. The method of claim 1 and further comprising forming a valve means for inflation of said enclosed, multipaneled envelope.

8. The method of claim 1 wherein said platen seal forming means is a heat sealing means.

9. The multipaneled, enclosed envelope formed by the method of claim 1.

10. The method of claim 6 wherein said webs of material are composite materials comprising a substrate of nonelastomeric polymeric sheet having a vapor deposited metal coaating on at least one side thereof.

11. A method for producing enclosed multipaneled envelopes from webs of material which are sealable on one side only comprising the steps of:
   (a) positioning a first web of said material of sufficient surface area to form a desired panel shape;
   (b) positioning at least one folded web member of said material over said first web such that the edges of the panel shape to be formed therefrom will be coextensive with an edge of the panel shape to be formed from said first web, said folded web comprising a double fold, the double fold line thereof positioned in a manner such that the sealing line used to define the panel shape of said first web intersects said double fold line to thereby form a pinched section in the resulting multipaneled enclosed envelope;
   (c) positioning a second web of said material over said first web and folded web such that the edges of the panel shape to be formed therefrom will be coextensive with the panel shape to be formed from said first web; and
   (d) platen sealing said first web, folded web and second web peripherally in the desired panel shape of said first and second webs.

* * * * *

UNITED STATES PATENT AND TRADEMARK OFFICE
CERTIFICATE OF CORRECTION

PATENT NO. : 4,290,763
DATED : September 22, 1981
INVENTOR(S) : Gerald L. Hurst

It is certified that error appears in the above-identified patent and that said Letters Patent are hereby corrected as shown below:

Column 3, line 30, change "$V_o^{2/3}$" to --$\dfrac{V_o^{2/3}}{S}$--.

Column 7, line 9, change "from" to --film--;
  line 44, change "octaheral" to --octahedral--;
  line 62, change "to" (first occurrence) to --top--.

Column 8, line 44, change "from" to --form--.

Column 10,
  line 24, change "celluslose" to --cellulose--;
  line 36, change "coaating" to --coating--.

Signed and Sealed this

Seventeenth Day of August 1982

[SEAL]

Attest:

*Attesting Officer*

GERALD J. MOSSINGHOFF
*Commissioner of Patents and Trademarks*